United States Patent
Olsson et al.

(10) Patent No.: US 10,776,083 B2
(45) Date of Patent: Sep. 15, 2020

(54) APPLICATION BUILDER WITH CONNECTED COMPONENTS

(71) Applicant: salesforce.com, inc., San Francisco, CA (US)

(72) Inventors: Kristian Olsson, Castro Valley, CA (US); Adheip Varadarajan, Daly City, CA (US); Leonard Thomas Washington, III, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/138,310

(22) Filed: Sep. 21, 2018

(65) Prior Publication Data
US 2020/0097268 A1   Mar. 26, 2020

(51) Int. Cl.
*G06F 9/44* (2018.01)
*G06F 8/38* (2018.01)

(52) U.S. Cl.
CPC ..................... *G06F 8/38* (2013.01)

(58) Field of Classification Search
CPC .......................................... G06F 8/38
See application file for complete search history.

(56) References Cited

U.S. PATENT DOCUMENTS

| | | | |
|---|---|---|---|
| 9,524,273 B2* | 12/2016 | Horton .................. | G06F 3/0482 |
| 2003/0067489 A1* | 4/2003 | Wong ..................... | H04L 67/36 |
| | | | 715/765 |
| 2011/0296314 A1* | 12/2011 | Prasad ..................... | G06F 8/10 |
| | | | 715/744 |
| 2012/0096429 A1* | 4/2012 | Desai ....................... | G06F 8/34 |
| | | | 717/107 |
| 2013/0055070 A1* | 2/2013 | Sacks ..................... | G06F 21/53 |
| | | | 715/234 |

* cited by examiner

*Primary Examiner* — Hang Pan
(74) *Attorney, Agent, or Firm* — Holland & Hart LLP

(57) ABSTRACT

An application builder system includes an application builder server and a client side application builder application. The application builder server includes a plurality of node type managers that correspond to different node types that may be included in an instance of a page requested by a user device. The server generates rendering instructions for a requested page using the different node type managers and transmits the rendering instructions to the user device for display at the user device. A user may modify the components of the page, and the client side application builder application modifies the rendering instructions of nodes corresponding to the modified components. The modified rendering instructions may be saved at the application server by the node type managers.

18 Claims, 12 Drawing Sheets

APPLICATION BUILDER WITH CONNECTED COMPONENTS

FIELD OF TECHNOLOGY

The present disclosure relates generally to database systems and data processing, and more specifically to an application builder with connected components.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support an application builder service that may be used by a user to design and publish applications for displaying interaction data, sales data, marketing data, for entering such data, for interacting with other users, etc. Conventional application builder systems may require a user to separately configure instructions for a large number of components of the application. In some cases, the components may include forms, containers, fields, pages, etc. Further, because the various components may be separately defined by instructions, the instructions may occupy or deplete computing resources such as memory, storage, and processing resources.

DETAILED DESCRIPTION

Figure 1:
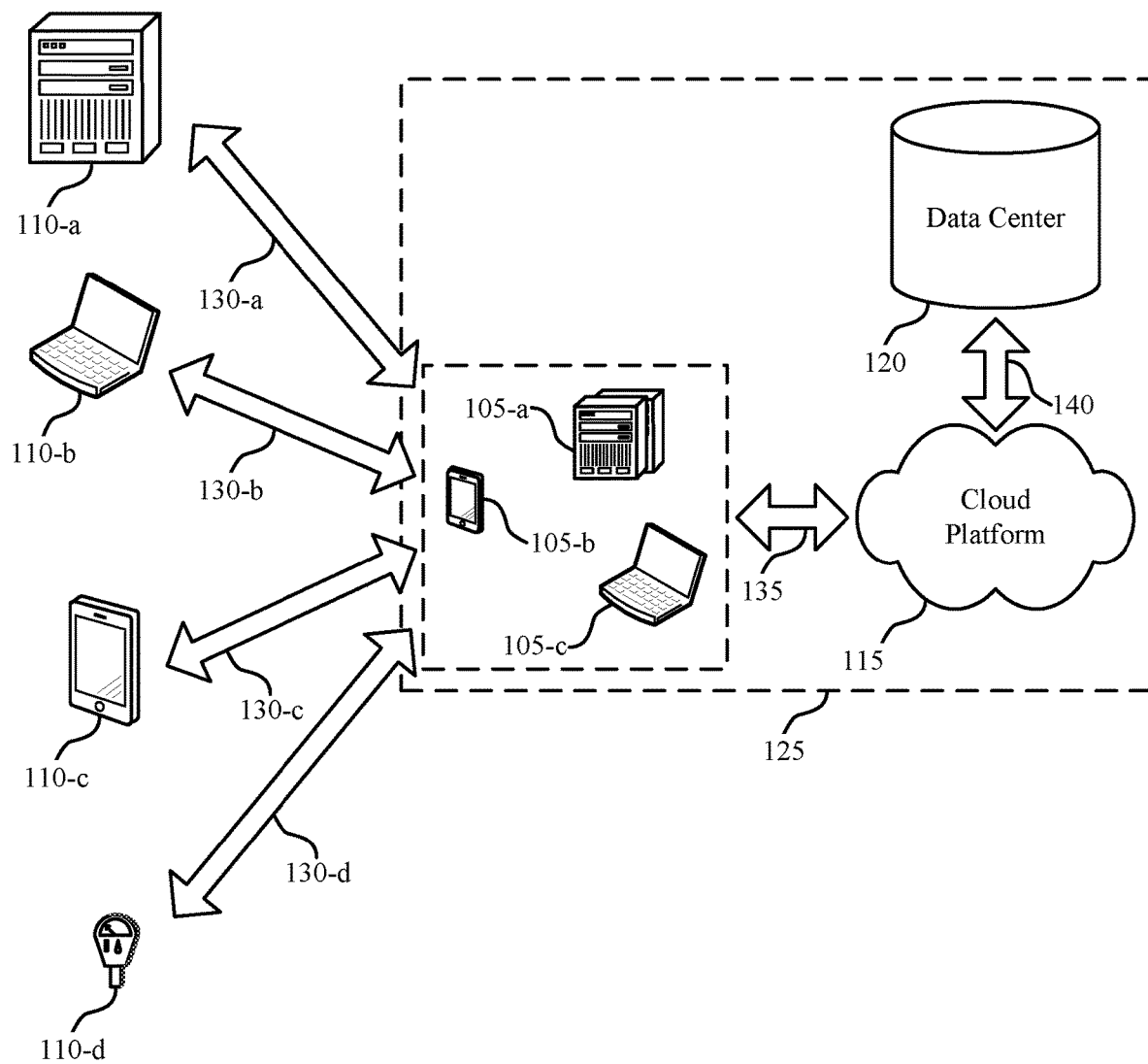
FIG. 1 illustrates an example of a system for editing components of a user interface that supports an application builder with connected components in accordance with aspects of the present disclosure.

An application builder system includes an application builder server and a client-side application builder application. A user of the client-side application designs applications for use by various users. Other users may utilize the custom applications to interact with client data (e.g., sales data), enter client data, monitor communications, etc. The application builder system described herein provides a user interface for designing custom applications for different purposes and uses connected components for storing and transmitting rendering instructions corresponding to the designed applications. The described application builder server of the application builder system described herein includes node type managers for generating rendering instructions corresponding to different types of components included in a page of a designed application. Different components are connected using a tree structure, which provides for efficient generation and storage of rendering instructions and allows for modifications to a page to be easily tracked and saved.

Applications may include pages and sub-components (e.g., containers, fields, forms) defined by nodes including rendering instructions. The application builder server includes node type managers for generating instructions corresponding to various types of nodes (e.g., components). The application builder server receives requests from a client device for pages of an application. The application builder, using the various node type managers corresponding to nodes included in the requested page, generates rendering instructions for the pages. The rending instructions may be generated in a tree format with nodes corresponding to components of the page. The rendering instructions are transmitted to the client device for display and modification by a user of the device. As the user modifies the pages, the rendering instructions are updated to reflect the modifications. Because the node types are configured by different node type managers, node types may be easily added to the application builder system. Further, because the rendering instructions are configured in a tree format, the changes to the page are easily updated in the corresponding rendering instructions.

As the application builder server generates the rendering instructions, the application builder may request rendering instructions to nodes based on dependencies included in the page data structure. For example, when the application builder server identifies a dependency (e.g., reference) to a form node, the application builder server requests the corresponding rendering instructions from a form node type manager. The request may include sending a request via an application programming interface (API) of the form node type manager. The application builder server combines rendering instructions received from a node type manager into a combined list of instructions. In some cases, the combined list is a JavaScript Object Notation (JSON) file with nodes corresponding to the components of the page. The nodes may include parameters indicating child nodes, parent nodes, node type, display area, etc.

Aspects of the disclosure are initially described in the context of an environment supporting an on-demand database service. Additional aspects of the disclosure are described with respect to a server configuration, a user device configuration, a user interface, as well as a method process flow. Aspects of the disclosure are further illustrated by and described with reference to apparatus diagrams, system diagrams, and flowcharts that relate to an application builder with connected components.

FIG. 1 illustrates an example of a system 100 for cloud computing that supports an application builder with connected components in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may further offer an application builder service to the cloud client 105. In some cases, the cloud client 105 may utilize the application builder to design applications for use by the cloud client 105 and/or one or more of the contacts 110. For example, cloud client 105 may design an application for displaying interaction data (e.g., associated with an interaction 130), sales data, marketing data etc. corresponding to a particular contact 110. The designed application may be accessible via an application executable on a computing device of the client 105 or via a browsing application (e.g., a web browser) executable on the computing device of the client 105. In some cases, the designed application may be a frame or sub-frame of a webpage, web-application, or the like. In some cases, a user (e.g., client 105) with administrative rights may utilize the application builder to design the application for the client 105 (e.g., for a specific contact 110 or for many contacts of the client).

The application builder service may include a client facing component with a user interface for designing applications for clients 105 and/or contacts 110. The application builder may be preconfigured with a number of different component types that may be utilized to design an application. Example component types include pages, containers, forms, fields, etc. The user interface of the client facing component may include a component pane with selectable components corresponding to the different component types. The user may select (e.g., click), drag the components to an application builder pane, and drop the component to a desired area of the application. The components may be linked to various data sources and processes. After the user publishes or releases the application, the client 105 and/or contacts 110 may access the application to access information and services provided by the application.

The various components of an application may be defined by various different types of metadata. For example, a field may be defined by metadata that includes parameters defining the field identification, placement, operation, etc. In some systems, the metadata for various components are independent. Thus, a user may have to independently customize different components including the metadata associated with components to design the application. Accordingly, each page of a particular application may be separately defined by metadata, and each component of each page may be separately defined by metadata. Because pages and components are separately defined, the metadata defining the pages and components may deplete or occupy significant computing resources such as memory, data storage, and bandwidth. Further, because a user or administrator may have to separately configure each component and page, application design may require a significant amount of time.

The system 100 may support a computing resource and time efficient application builder system using components that are interconnected and controlled by separate node type managers. The application builder system defines rendering instruction structure that allows for pages of an application and various associated elements (and sub-elements) within a page to be linked together via connectors and stored as nodes in a tree structure. The server system utilizes various node type managers corresponding to different node types (e.g., pages, forms, fields) for generating rendering instructions for an instance of a node type. Upon receiving a request from a client device for a specific page, the server retrieves metadata for a specific page and generates instructions corresponding to the components (e.g., nodes) for that page using the corresponding node type managers, and the instructions are transmitted to the client device in a tree structure format.

Because the rendering instructions are transmitted to the client device in a tree structure format, the client-side application builder application may easily modify the instructions based on the user or administrator modifying the UI displaying the page or application design. For example, if a user drags a field component from one container to another container, the client-side application may modify the parent and/or child parameters (e.g., dependencies) in each of the containers and the field component (e.g., nodes) rather than reconfiguring all or substantially all of the instructions for the page. Thus, the nodes are modified via a drag and drop user experience without the user being aware of the modifications. Because different node types are managed by different node type managers, different node types may be easily added to the application builder. As an example, a "graph" node type (e.g., for displaying a graph of sales data) may be added to the application builder system. The addition of the graph node type may include configuring the graph node type manager, but the addition may not require configuration of other node types such as pages, forms, containers, etc.

Further, when a page or application is saved at the client device, the client may transmit the rendering instructions (e.g., in a tree format) to the server side application system. The server side application system may deconstruct the instructions using node type managers corresponding to different node types included in the page or application. The node type managers may store a dependency to the node type in a page data structure (e.g., for future reconstruction) corresponding to the page and separately store the rendering instructions or metadata corresponding datastores. Because the nodes are deconstructed and stored separately (rather than in a complete page), computing resources such as processing and memory may be efficiently utilized.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
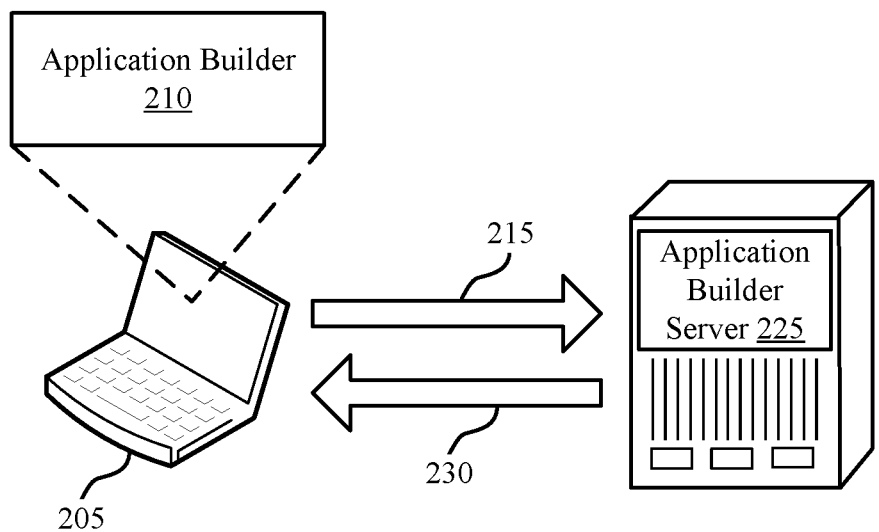
FIG. 2 illustrates an example of a system that supports an application builder with connected components in accordance with aspects of the present disclosure.

FIG. 2 illustrates an example of a system 200 that supports an application builder with connected components in accordance with aspects of the present disclosure. The system may include a user device 205 and an application builder server 225. The user device 205 and the application builder server 225 may be components of the subsystem 125, as described with reference to FIG. 1. For example, the user device 205 may be an example of a cloud client 105, while the application builder server 225 may be an example of a cloud platform 115 or data center 120. As illustrated, the application builder server 225 may support an application builder application 210 at the user device 205.

The application builder server 225 may receive an incoming communication message over a communication link 215 and from the user device 205. For example, a user or of the user device 205 may request (e.g., via the application builder application 210) an instance of a page of an application for further editing or design. In some examples, the page may be a page or component of an application designed for a contact (e.g., a contact 110 of FIG. 1) of a cloud client 105. In some cases, the user may be an administrator of the cloud client 105. In response to receiving the request for the instance of the page, the application builder server 225 may retrieve the page data structure corresponding to the page from a datastore. In some example implementations, the page data structure corresponds to a root node of a tree corresponding to the components of the page.

After retrieving the page data structure (e.g., the root node) corresponding to the requested page, the application builder server 225 uses dependencies included in the page data structure to generate rendering instructions corresponding to the page. For example, the page data structure may include dependencies that identify sub-components (e.g., containers, forms, fields) of the page. Using these dependencies, the application builder server 225 may request the corresponding rendering instructions from respective node type managers. As an example, the page data structure includes a dependency identifying a container as a sub-component of the page. The application builder server 225 may request the container from the container node type manager. As described in more detail below, in response to the request, the container node type manager returns rendering instructions corresponding to the node. The application builder server 225 may include a component that aggregates the various rendering instructions received from the node type managers. After the rendering instructions are generated, the application builder server 225 transmits the rendering instructions to the user device 205.

At the user device 205, the application builder application 210 displays the page corresponding to the received rendering instructions. The user may manipulate (e.g., move, delete, add) various page components using the user interface. A sub-system of the application builder application 210 modifies the rendering instructions according to the manipulations by the user. Further, the sub-system may enforce various dependency rules. For example, a "field" node type may not contain a "container" node type. The user may save or submit the modified page. In response to saving or submitting, the application builder application 210 transmits the modified rendering instructions to the application builder server 225 via connection 230. The application builder server 225 may deconstruct the rendering instructions using various node type managers corresponding to the nodes included in the page.

Figure 3:
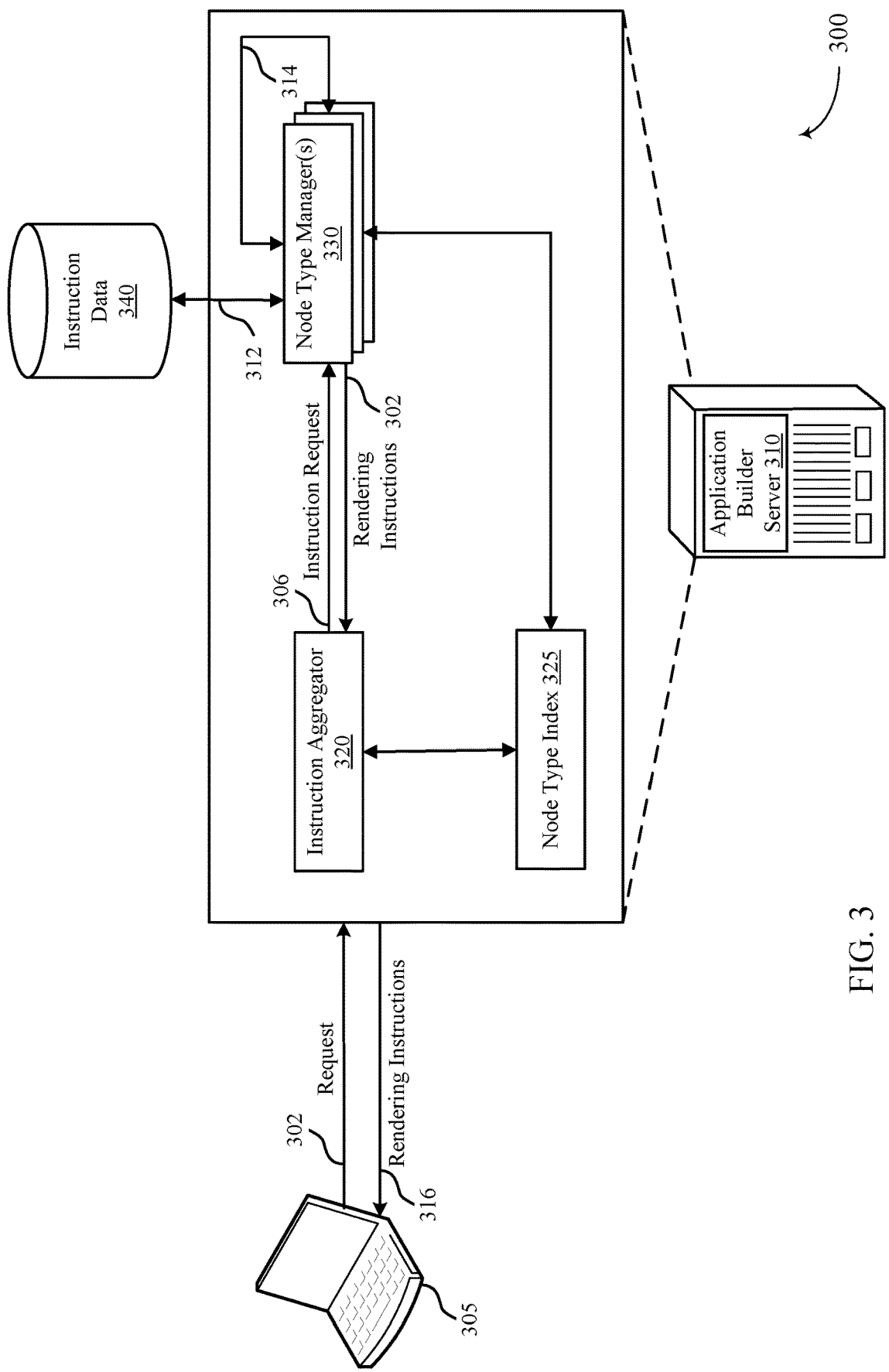
FIG. 3 illustrates an example of a system including a server configuration that supports an application builder with connected components in accordance with aspects of the present disclosure.

FIG. 3 illustrates an example of a system 300 including a server 310 that supports an application builder with connected components in accordance with aspects of the present disclosure. The system further includes a user device 305, which may be an example of a cloud client 105 of FIG. 1 or the user device 205 of FIG. 2. The application builder server 310 may be an example of a cloud platform 115 or data center 120 of FIG. 1 or the application builder server 225 of FIG. 2. The application builder server 310 supports an application builder application at the user device 305.

The application builder server 310 receives a request 302 over a communication link between the user device 305 and the application builder server 310. As described in more detail with respect to FIG. 7, the request 302 may be received at a request interface (e.g., interface 720) and may identify an instance of a page of an application. An instruction aggregator 320 of the application builder server 310 requests and receives, from a corresponding node type manager 330, a page data structure (e.g., a root node) corresponding to the requested page. For example, the request includes an identification of a page, and the instruction aggregator 320 requests instructions corresponding to the page (e.g., a node) from the page node type manager 330. The node type manager 330 retrieves the instructions corresponding to the page (e.g., the page data structure) from the instruction data store 340. A node type identifier (e.g., node type identifier 825 of FIG. 8), which may be a sub-component of the instruction aggregator 320, identifies one or more dependencies included in the page data structure. The one or more dependencies correspond to at least one of the node types included in the requested page. The instruction aggregator may use a node type index 325 to identify one of the node type managers 330 corresponding to the referenced (e.g., via the dependencies) node types. Based on the identified node type managers, an instruction request component (e.g., an instruction request component 830 of FIG. 8), which may be a sub-component of the instruction aggregator 320, transmits an instruction request 306 to the corresponding one or more of the node type managers 330. For example, the page data structure may include a dependency identifying a "container" node type as a sub-component of the page. Based on the dependency, the instruction aggregator 320 uses the node type index 325 to identify the node type manager 330 corresponding to the container node type. The instruction aggregator 320 may transmit an instruction request 306 to the container node type manager 330 for rendering instructions corresponding to the container. Accordingly, the instruction aggregator 320 (using the node type index 325) identifies the node type managers 330 for generating instructions corresponding to nodes included in the page.

The node type managers 330 may utilize a communication link 312 with an instruction data storage 340 to store and retrieve rendering instructions or metadata corresponding to various node types. The various node types may be stored as a plurality of different metadata types in the instruction data storage 340. The node type managers 330 may retrieve the metadata types and generate the corresponding instructions based on the metadata types. In some example implementations, the node type managers 330 can rederive the rendering instructions from multiple and different types of sources. For example, the node type manager 330 retrieves some instructions from a database (e.g., the instruction data store 340) and/or the node type manager 330 calls an API for generating the rendering instructions. Based on the instruction request 306 received from the instruction aggregator 320, the node type manager 330 generates the rendering instructions for the node, and the node type manager 330 may further determine that the node includes a dependency to another node type. Accordingly, the node type manager 330 may identify the corresponding node type manager using the node type index 325 and transmit a request 314 to the corresponding node type manager for rendering instructions corresponding to the dependency. For example, the container node type manager generates rendering instructions for a container node type, identifies a form node type within the container (e.g., using the node type index 325), and transmits a request 314 to the form node type manager for the rendering instructions corresponding to the form node. The rendering instructions corresponding to the form node are returned to the container node type manager and included in the rendering instructions (e.g., as a dependency) for the container node. In other implementations, the instruction aggregator 320 calls each of the node type managers 330 for generating corresponding rendering instructions. Accordingly, as the instruction aggregator 320 identifies various dependencies in the page data structure and/or rendering instructions returned from previous requests 306, the instruction aggregator 320 transmits subsequent requests 306 for rendering instruction from corresponding node type managers 330.

Rendering instructions 316 may be returned to the instruction aggregator 320. The rendering instructions corresponding to each node may include parameters indicating the node type, display region, identification of a parent node, identification of a child node, or a combination thereof. The rendering instructions 316 may be aggregated, based on the instructions received from the node type managers 330, into a combined list of instructions. The combined list may be in tree format, with components corresponding to different nodes of the tree. In some cases, the combine list is a JSON file including the rendering instructions including dependencies to form the tree structure. The rendering instructions 316 are transmitted to the user device 305 where a page corresponding to the rendering instructions are displayed for modification by the user.

Figure 4:
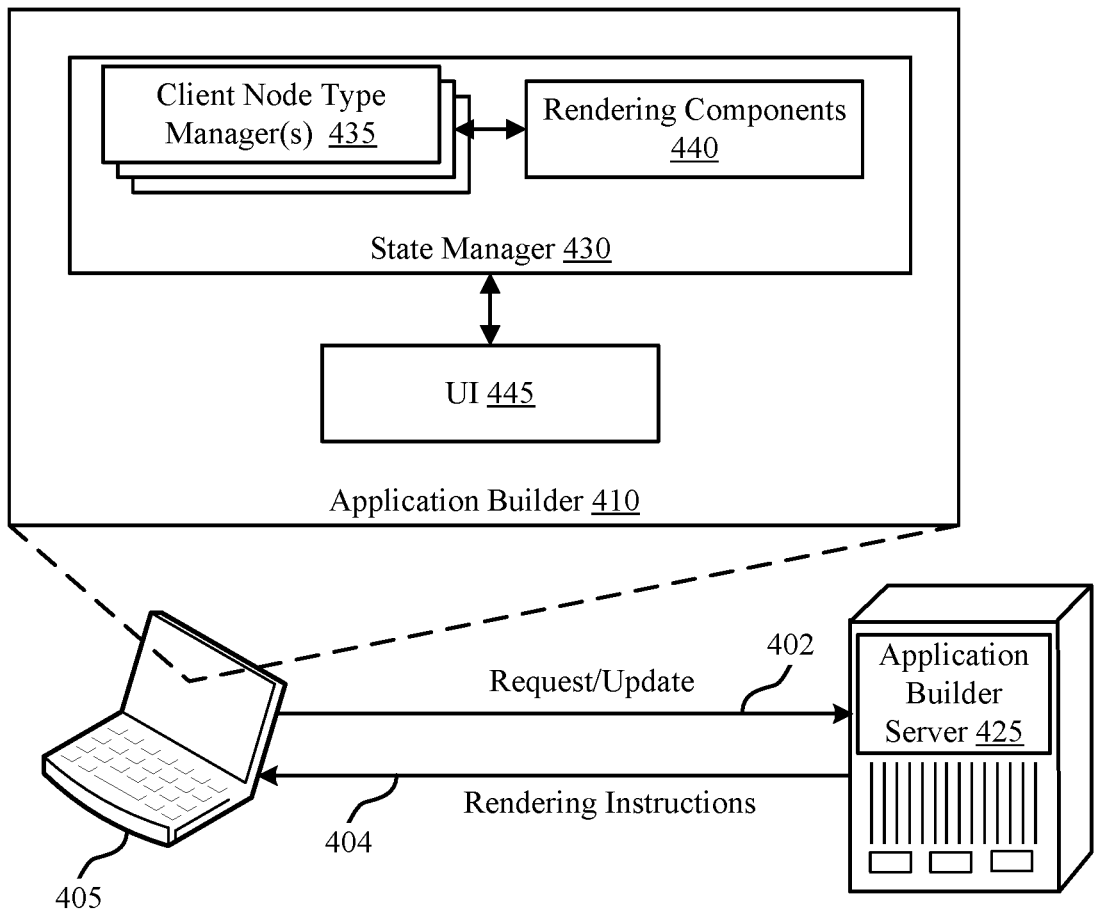
FIG. 4 illustrates an example of a system including a user device that supports an application builder with connected components in accordance with aspects of the present disclosure.

FIG. 4 illustrates an example of a system 400 including a user device 405 that supports an application builder with connected components in accordance with aspects of the present disclosure. The user device 405 may be examples of the corresponding devices with respect to FIG. 3. The system 400 further includes an application builder server 425, which may be an example of the corresponding server described with respect to FIG. 3. An application builder application 410 at the user device 405 is used in association with the application builder server 425 to design applications. The user device 406 (e.g., via the application builder application 410) may transmit a request 402 to the application builder server 425 for rendering instructions for an instance of a page of an application. In some cases, the request 402 may be transmitted responsive to the user opening the page or the application that includes the page. Responsive to the request, the application builder server 425 may generate and transmit the rendering instructions 404 (e.g., in a tree structure) to the user device 405.

The application builder application 410 includes a user interface (UI) component 445 that displays the page corresponding the received rendering instructions 404. The application builder application 410 may further include a state manager 430, which may include client node type managers 435. The client node type managers 435 correspond to each of the node types (e.g., container, field, form). As the user edits the page (e.g., drags and drops components, deletes components, adds components, resizes components) via the user interface component 445, the state manager 430 via the corresponding client node type managers 435, modifies the rendering instructions by updating dependencies, modifying parameters, etc.

In some cases, the client node type managers 435 are mapped to rendering components 440, which include rules for drag and drop capabilities. In some cases, rendering components include "containers" and "elements." A container defines an area in which components (e.g., fields, forms) may be dropped into. An element defines an element that may be moved about the page and put into containers. Examples of elements include fields and forms. Thus, the rendering components 440 define rules for placing different node types, and the rules may be enforced via the client node type managers 435.

The user may save or submit the page of the application, and modified rendering instructions are sent to the application builder server 425 in an update 402. The application builder server 425 may deconstruct the rendering instructions using the node type managers corresponding to nodes included in the page. Thereafter, the application including the page may be pushed for use by a client or may be further modified in accordance with aspects of the present disclosure.

Figure 5:
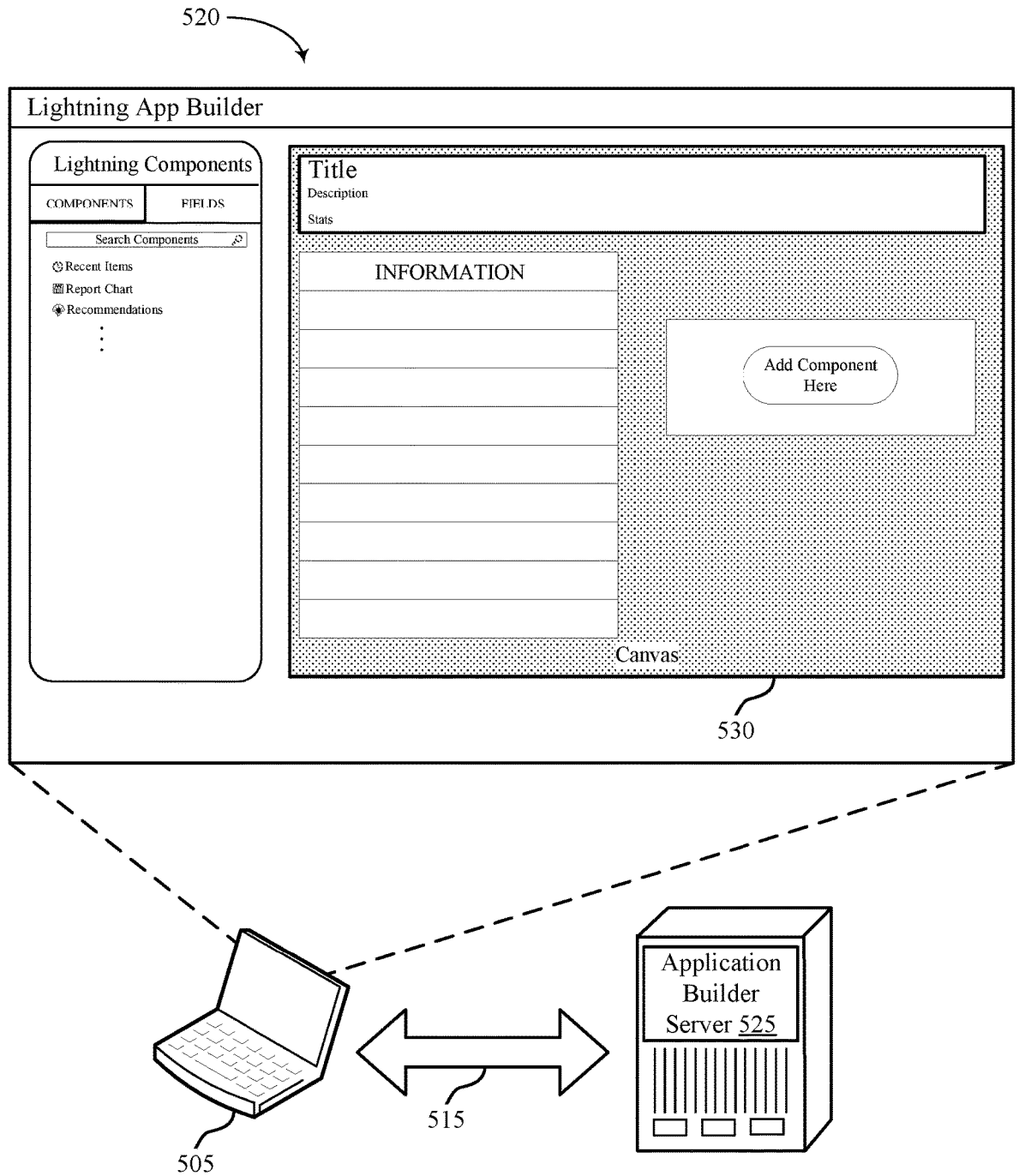
FIG. 5 illustrates an example of a user interface that supports an application builder with connected components in accordance with aspects of the present disclosure.

FIG. 5 illustrates an example of an application builder process 500 that supports an application builder with connected components in accordance with aspects of the present disclosure. The example application builder process 500 may include a user device 505 requesting and receiving rendering instructions from an application builder server 525 over a communication link 515, as described herein with reference to FIGS. 2 through 4. The user device 505 may display a page corresponding the received rendering instructions in a user interface 520, and a user operating the user device 505 may interact with the user interface 520 in order to design an application and pages of an application.

The user interface 520, as illustrated, is one possible example of a user interface 520 for application building. In this exemplary case, the user may select components from a components pane (e.g., "Lightning Components") and drag the selected components to a desired area in a canvas 530. A background client process (e.g., state manager 430 as described herein with respect to FIG. 4) enforces rules associated with components and updates the rendering instructions based on modifications by the user. The user may periodically save the application design as illustrated on the canvas 530. In response to a save by the user or an automatic save, the application builder application transmits modified rendering instructions to the application builder server 525 via communication link 515. The application builder server 525 deconstructs and saves the rendering instructions in accordance with aspects of the present disclosure.

Figure 6:
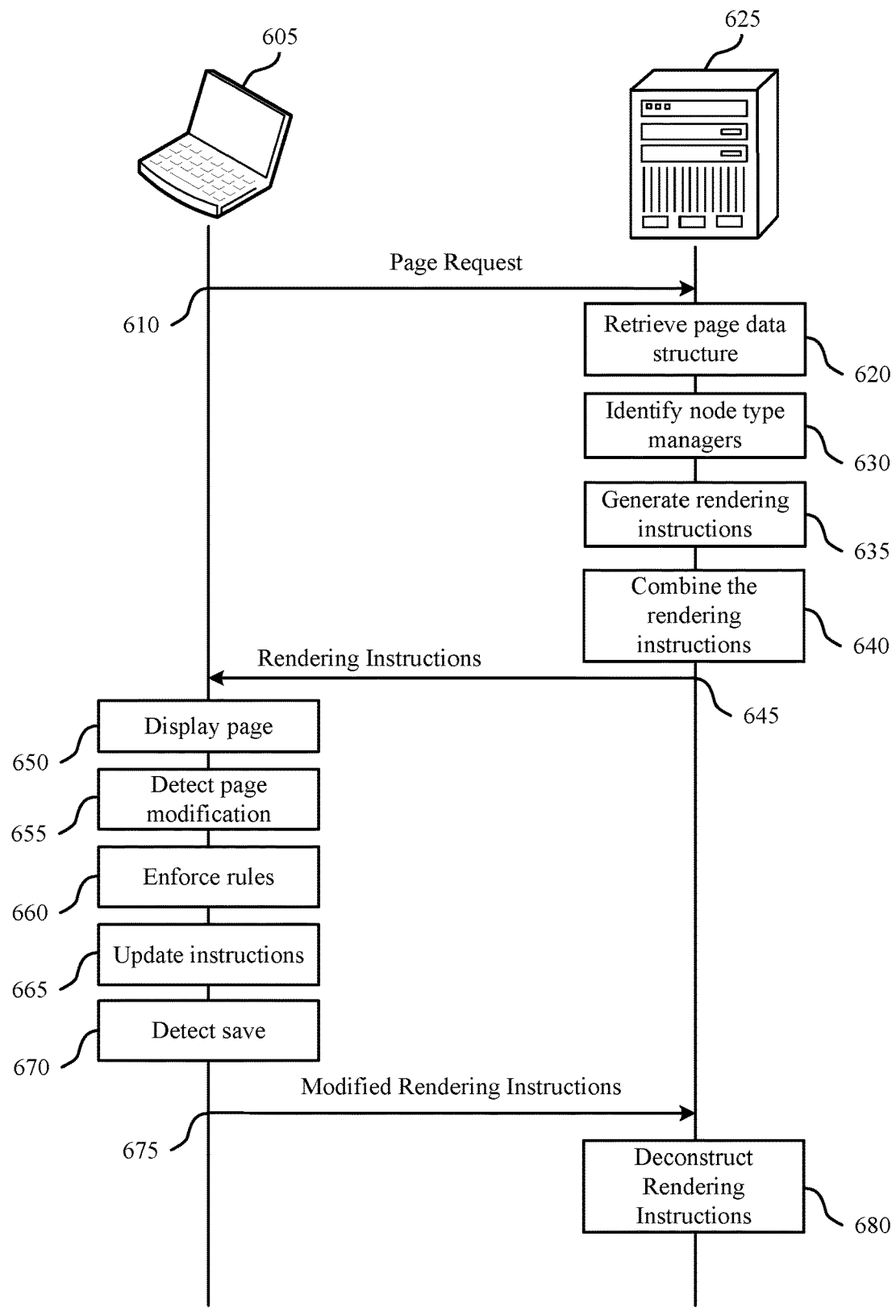
FIG. 6 illustrates an example of a process flow in a system that supports an application builder with connected components in accordance with aspects of the present disclosure.

FIG. 6 illustrates an example of a process flow 600 that supports an application builder with connected components in accordance with aspects of the present disclosure. The process flow 600 may include a user device 605 and an application builder server 625. The user device 605 and the application builder server may be examples of the corresponding devices described with respect to FIGS. 2 through 5. With reference to FIG. 1, the user device 605 may be an example of a cloud client 105, and the application builder server 625 may be an example of a component of a cloud platform 115 or a data center 120. A user of the user device 605 may be an administrator of the cloud client 105 using an application builder application at the user device 605 to design an application corresponding to an example of a contact 110.

At 610, the user device 605 transmits a request for an instance of a page that is displayable and modifiable at the user device 605. In some cases, the page request may be sent responsive to a user of the user device 605 opening a page or an application. The page request may include an identification of the page, an application, etc. The requested page may be an example of a previously designed page, a page template, etc. that includes a plurality of different component types that are stored as a plurality of different metadata types at the server. The requested page is associated with a page data structure that is stored at the server. The user may be requesting the page such that the user may edit the page for an application designed for the cloud client.

At 620, the application builder server 625 retrieves the page data structure corresponding to the requested page. In some cases, the page data structure corresponds to a root node of a tree, where the root node includes one or more dependencies to different node types. The page data structure may be retrieved from a corresponding page node type manager.

At 630, the application builder server 625 identifies node type managers for generating rendering instructions corresponding to the requested page. The node type managers may be identified based on the dependencies (e.g., references) to the node type included in the page data structure (e.g., the root node). For example, the page data structure includes a dependency identifying a form node type. Accordingly, the application builder server 625 may identify the form node type manager for generating the rendering instructions corresponding to the form included in the page.

At 635, the application builder server 625 generates the rendering instructions corresponding to the page. For example, the node managers identified at 630 generate the rendering instructions corresponding to the nodes of the tree structure associated with the requested page. The generating may include transmitting a request for the rendering instructions from the corresponding node type managers responsive to identifying the corresponding node type manager based on the dependencies included in the page data structure. In some cases, the container node type manager generate the dependency in the generated rendering instructions such that the instruction aggregator (e.g., the instruction aggregator 320 of FIG. 3) may request the corresponding rendering instructions. The rendering instructions generated by the node type managers may include parameters indicating child nodes, parent nodes, node type, display region, internal text, or a combination thereof. The node type managers may retrieve the corresponding rendering instructions from various different sources. In some cases, the node type managers generate instructions by retrieving the instructions from a database. In some cases, the node type managers generate the instructions by requesting the instructions from an API.

At 640, the application builder server 625 combines the rendering instructions generated by the node type managers. The combining may include generating a list or document including the rendering instructions. In some cases, the combined list is a JSON file of rendering instructions. The rendering instructions for each of the nodes included in the page may correspond to a node of a tree structure. For example, the rendering instructions may include parameters indicating a child node or a parent node. In some cases, a particular node may correspond to a container node including a parameter indicating a child node that is of an element node type (e.g., form, field). Thus, in some cases, the application builder server 625 generates the tree structure including the rendering instructions corresponding to each of the plurality of different node types.

At 645, the application builder server 625 transmits at least the rendering instructions corresponding to each of the plurality of different node types to the user device 605. The rendering instructions may be transmitted as a combined list, a document, a JSON file, etc. and may be formatted in a tree structure. Thus, in some cases, the tree structure is transmitted to the user device 605. In some cases, the transmitted tree structure includes a node corresponding to each of the plurality of different node types, and at least one node of the tree structure corresponds to a container node type node including a parameter indicating a child node corresponding to an element node type. At 650, the user device 605 displays the page corresponding to the received page. The displaying may be performed by an application builder application on the user device 605. The page is displayed for the user to edit for designing the application. At 655, the user device 605 detects modification of the page. In some cases, the modification may include adding a component (e.g., node), removing a component, moving a component, resizing a component, etc. At 650, the user device 605 enforces rules corresponding to nodes. For example, nodes corresponding to elements may not have another element or container moved within the element node. If such a movement is attempted, the application may display an error, for example. At 665, the user device 606 updates the instructions corresponding to the page based on the modification of the page by the user. Updating the rendering instructions may include updating parameters corresponding to the node including the parameters indicating a child node, parent node, display region, etc.

At 675, the user device 605 transmits modified rendering instructions to the application builder server 625. The modified rendering instructions may be transmitted as a combined list, a document, JSON file, etc. The transmitting may occur responsive to a save by the user or may periodically occur for saving purposes. At 680, the application builder server 625 deconstructs the rendering instructions. The deconstructing may include transmitting the nodes to the corresponding node type managers, inserting dependencies for future reconstructions, storing the instructions at respective datastores, etc.

Figure 7:
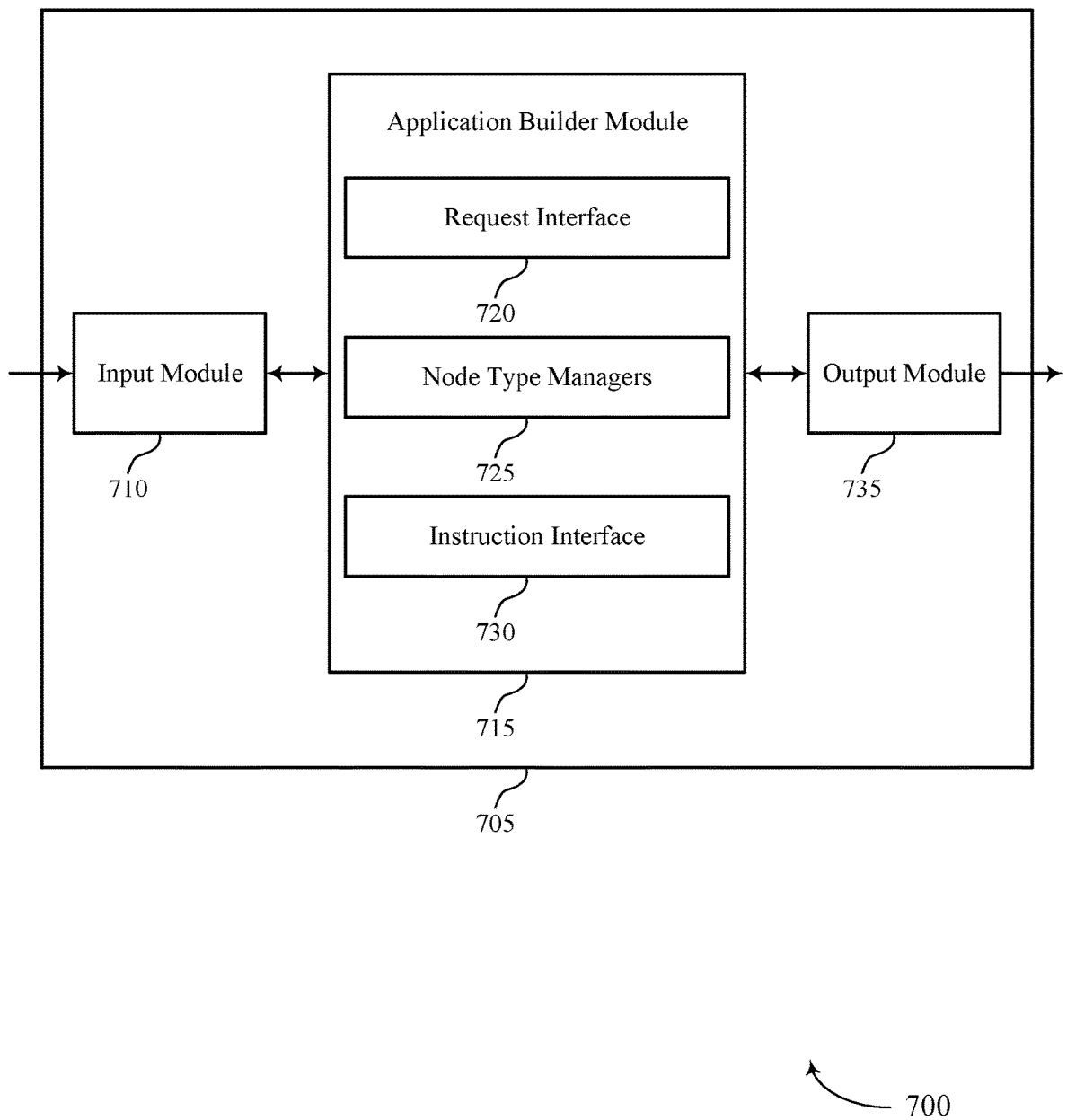
FIG. 7 shows a block diagram of an apparatus that supports an application builder with connected components in accordance with aspects of the present disclosure.

FIG. 7 shows a block diagram 700 of an apparatus 705 that supports an application builder with connected components in accordance with aspects of the present disclosure. The apparatus 705 may include an input module 710, an application builder module 715, and an output module 735. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the data retention module 715 to support data retention handling for data object stores. In some cases, the input module 710 may be a component of an input/output (I/O) controller 915 as described with reference to FIG. 9.

The application builder module 715 may include a request interface 720, one or more node type managers 725, and an instruction interface 730. The application builder module 715 may be an example of aspects of the application builder module 805 or 910 described with reference to FIGS. 8 and 9.

The application builder module 715 and/or at least some of its various sub-components may be implemented in hardware, software executed by a processor, firmware, or any combination thereof. If implemented in software executed by a processor, the functions of the application builder module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The application builder module 715 and/or at least some of its various sub-components may be physically located at various positions, including being distributed such that portions of functions are implemented at different physical locations by one or more physical devices. In some examples, the application builder module 715 and/or at least some of its various sub-components may be a separate and distinct component in accordance with various aspects of the present disclosure. In other examples, the application builder module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The request interface 720 may receive, at a server and from a user device, a request for an instance of a page displayable at the user device, where the page includes a set of different node types which are stored as a set of different metadata types at the server, and where the page is associated with a page data structure.

The node type managers 725 may generate, by a node type manager corresponding to each of the set of different node types and based on dependencies to the corresponding node types included in the page data structure, rendering instructions corresponding to each of the set of node types.

The instruction interface 730 may transmit at least the rendering instructions corresponding to each of the set of node types to the user device.

The output module 735 may manage output signals for the apparatus 705. For example, the output module 735 may receive signals from other components of the apparatus 705, such as the data retention module 715, and may transmit these signals to other components or devices. In some specific examples, the output module 735 may transmit output signals for display in a user interface, for storage in a database or data store, for further processing at a server or server cluster, or for any other processes at any number of devices or systems. In some cases, the output module 735 may be a component of an I/O controller 915 as described with reference to FIG. 9.

Figure 8:
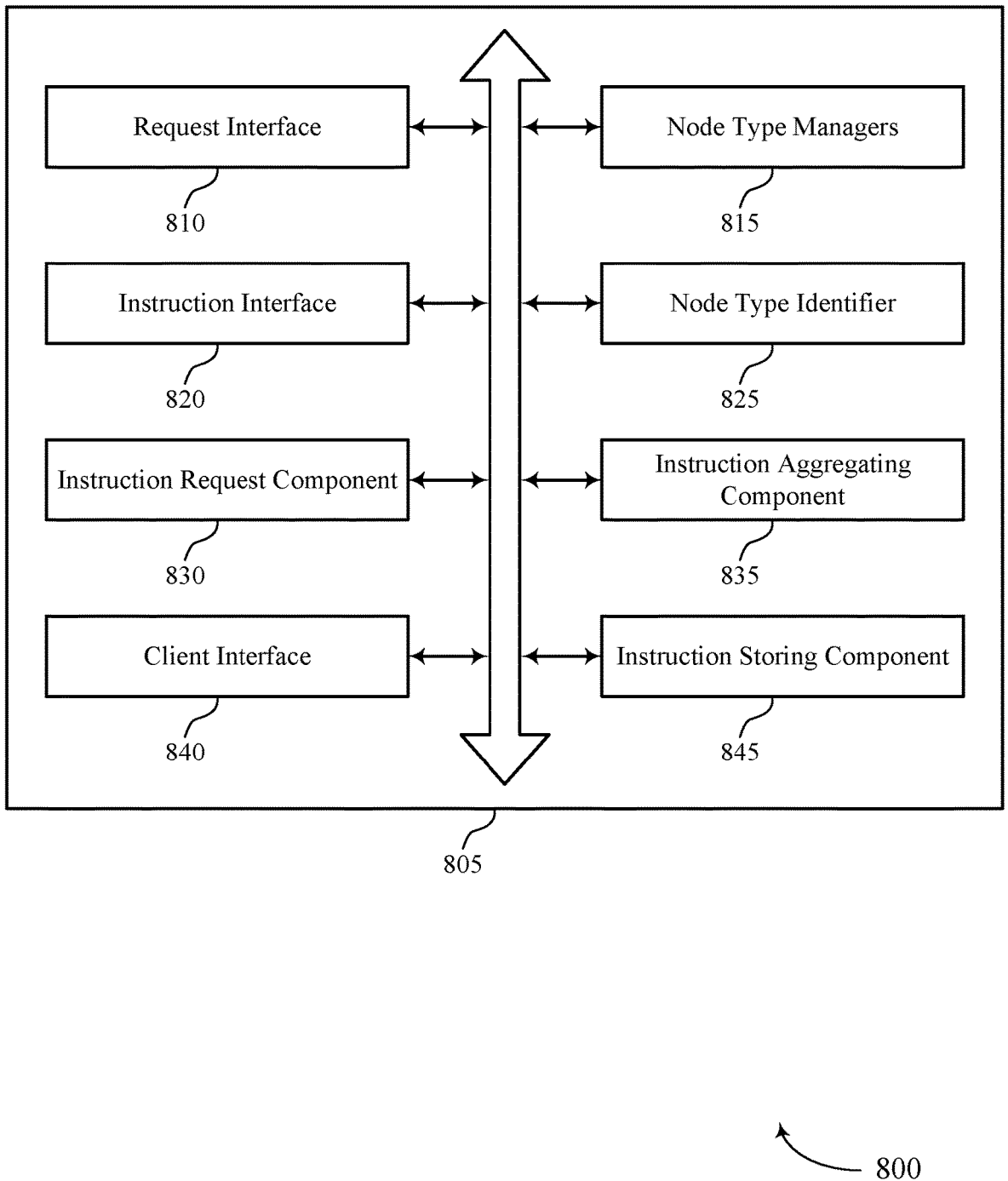
FIG. 8 shows a block diagram of an application builder module that supports an application builder with connected components in accordance with aspects of the present disclosure.

FIG. 8 shows a block diagram 800 of an application builder module 805 that supports an application builder with connected components in accordance with aspects of the present disclosure. The application builder module 805 may be an example of aspects of an application builder module 715 or an application builder module 910 described herein. The application builder module 805 may include a request interface 810, node type managers 815, an instruction interface 820, a node type identifier 825, an instruction request component 830, an instruction aggregating component 835, a client interface 840, and an instruction storing component 845. Each of these modules may communicate, directly or indirectly, with one another (e.g., via one or more buses).

The request interface 810 may receive, at a server and from a user device, a request for an instance of a page displayable at the user device, where the page includes a set of different node types which are stored as a set of different metadata types at the server, and where the page is associated with a page data structure.

The node type manager 815 may generate, by one of the node type managers corresponding to each of the set of different node types and based on dependencies to the corresponding node types included in the page data structure, rendering instructions corresponding to each of the set of node types.

In some examples, the node type managers 815 may generate at least one of the dependencies to the corresponding node types.

In some examples, the node type managers 815 may generate the node of the tree structure corresponding to each of the set of different node types.

The instruction interface 820 may transmit at least the rendering instructions corresponding to each of the set of node types to the user device.

In some examples, the instruction interface 820 may transmit the tree structure to the user device.

The node type identifier 825 may identify the node type manager corresponding to each of the set of node types based on the dependencies to each of the plurality of different node types included in the page data structure.

The instruction request component 830 may transmit, to the node type manager corresponding to each of the set of different node types, a request for the rendering instructions responsive to identifying the corresponding to node type manager based on the dependencies including in the page data structure.

The instruction aggregating component 835 may combine each of the rendering instructions, generated by the corresponding node type manager, into a combined list of instructions.

In some examples, the instruction aggregating component 835 may generate a tree structure including the rendering instructions corresponding to each set of node types.

The client interface 840 may receive modified rendering instructions from the client device.

The instruction storing component 845 may transmit portions of the modified rendering instructions corresponding to the node type to the corresponding node type manager.

Figure 9:
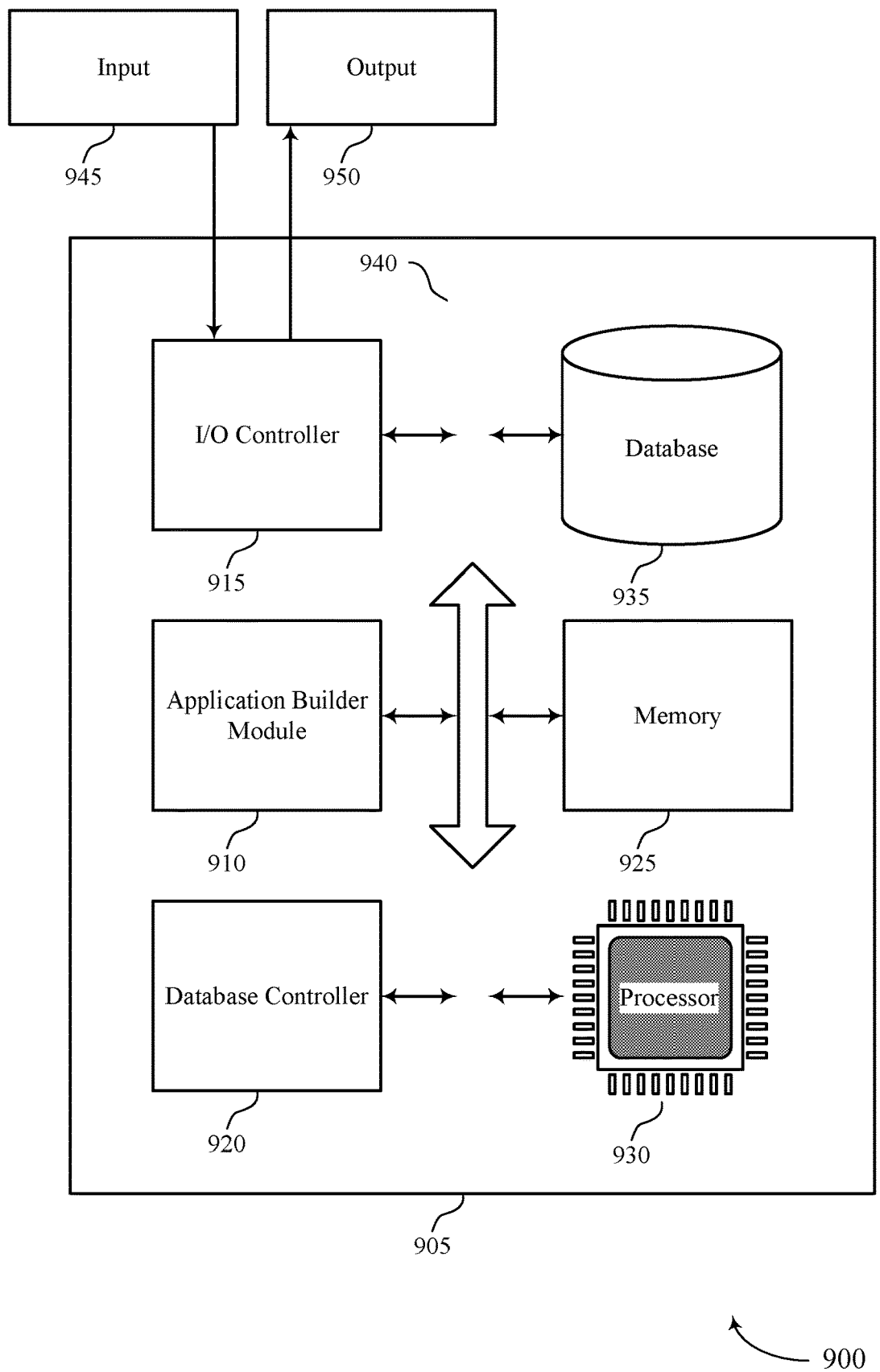
FIG. 9 shows a diagram of a system including a device that supports an application builder with connected components in accordance with aspects of the present disclosure.

FIG. 9 shows a diagram of a system 900 including a device 905 that supports an application builder with connected components in accordance with aspects of the present disclosure. The device 905 may be an example of or include the components of an application server or an apparatus 705 as described herein. The device 905 may include components for bi-directional data communications including components for transmitting and receiving communications, including an application builder module 910, an I/O controller 915, a database controller 920, memory 925, a processor 930, and a database 935. These components may be in electronic communication via one or more buses (e.g., bus 940).

The application builder module 910 may be an example of an application builder module 715 or 805 as described herein. For example, the application builder module 910 may perform any of the methods or processes described herein with reference to FIGS. 7 and 8. In some cases, the application builder module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting an application builder with connected components).

Figure 10:
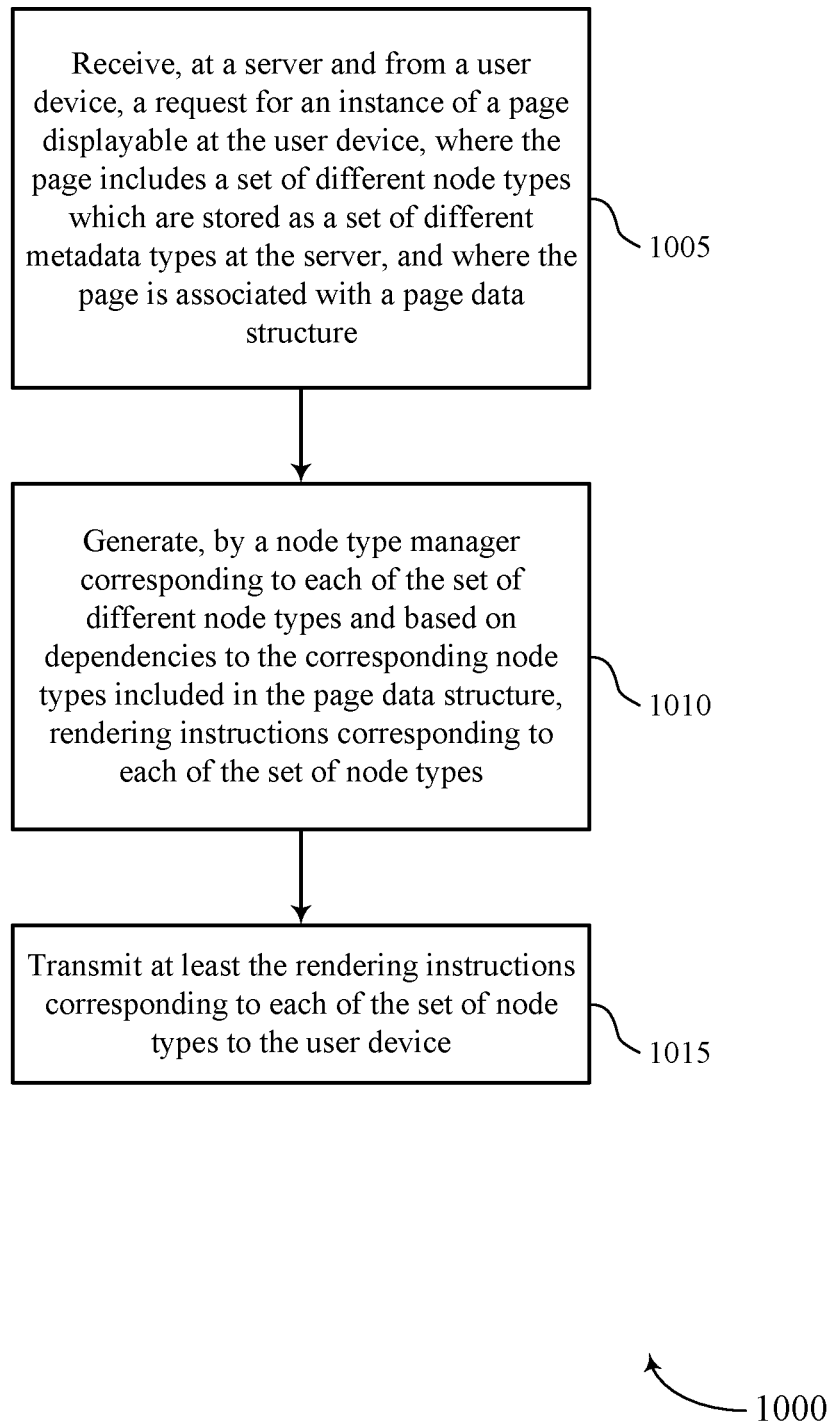
FIGS. 10 through 12 show flowcharts illustrating methods that support application builder with connected components in accordance with aspects of the present disclosure.

FIG. 10 shows a flowchart illustrating a method 1000 that supports an application builder with connected components in accordance with aspects of the present disclosure. The operations of method 1000 may be implemented by an application server or its components as described herein. For example, the operations of method 1000 may be performed by an application builder module as described with reference to FIGS. 7 through 9. In some examples, an application server may execute a set of instructions to control the functional elements of the application server to perform the functions described herein. Additionally or alternatively, an application server may perform aspects of the functions described herein using special-purpose hardware.

At 1005, the application server may receive, at a server and from a user device, a request for an instance of a page displayable at the user device, where the page includes a set of different node types which are stored as a set of different metadata types at the server, and where the page is associated with a page data structure. The operations of 1005 may be performed according to the methods described herein. In some examples, aspects of the operations of 1005 may be performed by a request interface as described with reference to FIGS. 7 through 9.

At 1010, the application server may generate, by a node type manager corresponding to each of the set of different node types and based on dependencies to the corresponding node types included in the page data structure, rendering instructions corresponding to each of the set of node types. The operations of 1010 may be performed according to the methods described herein. In some examples, aspects of the operations of 1010 may be performed by a node type manager as described with reference to FIGS. 7 through 9.

At 1015, the application server may transmit at least the rendering instructions corresponding to each of the set of node types to the user device. The operations of 1015 may be performed according to the methods described herein. In some examples, aspects of the operations of 1015 may be performed by an instruction interface as described with reference to FIGS. 7 through 9.

Figure 11:
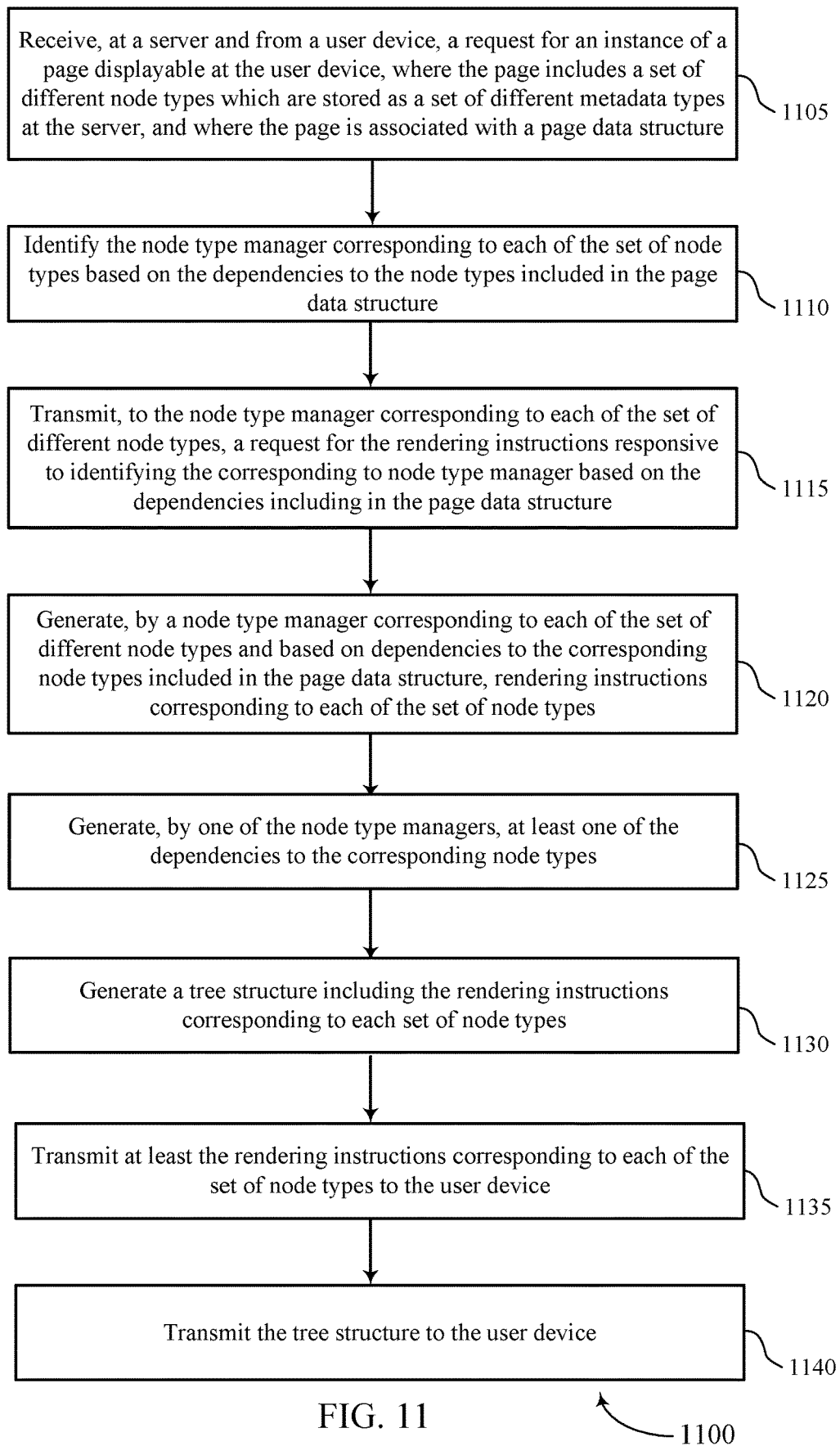

FIG. 11 shows a flowchart illustrating a method 1100 that supports an application builder with connected components in accordance with aspects of the present disclosure. The operations of method 1100 may be implemented by an application server or its components as described herein. For example, the operations of method 1100 may be performed by an application builder module as described with reference to FIGS. 7 through 9. In some examples, an application server may execute a set of instructions to control the functional elements of the application server to perform the functions described herein. Additionally or alternatively, an application server may perform aspects of the functions described herein using special-purpose hardware.

At 1105, the application server may receive, at a server and from a user device, a request for an instance of a page displayable at the user device, where the page includes a set of different node types which are stored as a set of different metadata types at the server, and where the page is associated with a page data structure. The operations of 1105 may be performed according to the methods described herein. In some examples, aspects of the operations of 1105 may be performed by a request interface as described with reference to FIGS. 7 through 9.

At 1110, the application server may identify the node type manager corresponding to each of the set of node types based on the dependencies to each of the plurality of different node types included in the page data structure. The operations of 1110 may be performed according to the methods described herein. In some examples, aspects of the operations of 1110 may be performed by a node type identifier as described with reference to FIGS. 7 through 9.

At 1115, the application server may transmit, to the node type manager corresponding to each of the set of different node types, a request for the rendering instructions responsive to identifying the corresponding to node type manager based on the dependencies including in the page data structure. The operations of 1115 may be performed according to the methods described herein. In some examples, aspects of the operations of 1115 may be performed by an instruction request component as described with reference to FIGS. 7 through 9.

At 1120, the application server may generate, by a node type manager corresponding to each of the set of different node types and based on dependencies to the corresponding node types included in the page data structure, rendering instructions corresponding to each of the set of node types. The operations of 1120 may be performed according to the methods described herein. In some examples, aspects of the operations of 1120 may be performed by a node type manager as described with reference to FIGS. 7 through 9.

At 1125, the application server may generate, by one of the node type managers, at least one of the dependencies to the corresponding node types. The operations of 1125 may be performed according to the methods described herein. In some examples, aspects of the operations of 1125 may be performed by a node type manager as described with reference to FIGS. 7 through 9

At 1130, the application server may generate a tree structure including the rendering instructions corresponding to each set of node types. The operations of 1130 may be performed according to the methods described herein. In some examples, aspects of the operations of 1130 may be performed by an instruction aggregating component as described with reference to FIGS. 7 through 9.

At 1135, the application server may transmit at least the rendering instructions corresponding to each of the set of node types to the user device. The operations of 1135 may be performed according to the methods described herein. In some examples, aspects of the operations of 1135 may be performed by an instruction interface as described with reference to FIGS. 7 through 9.

At 1140, the application server may transmit the tree structure to the user device. The operations of 1140 may be performed according to the methods described herein. In some examples, aspects of the operations of 1140 may be performed by an instruction interface as described with reference to FIGS. 7 through 9.

Figure 12:
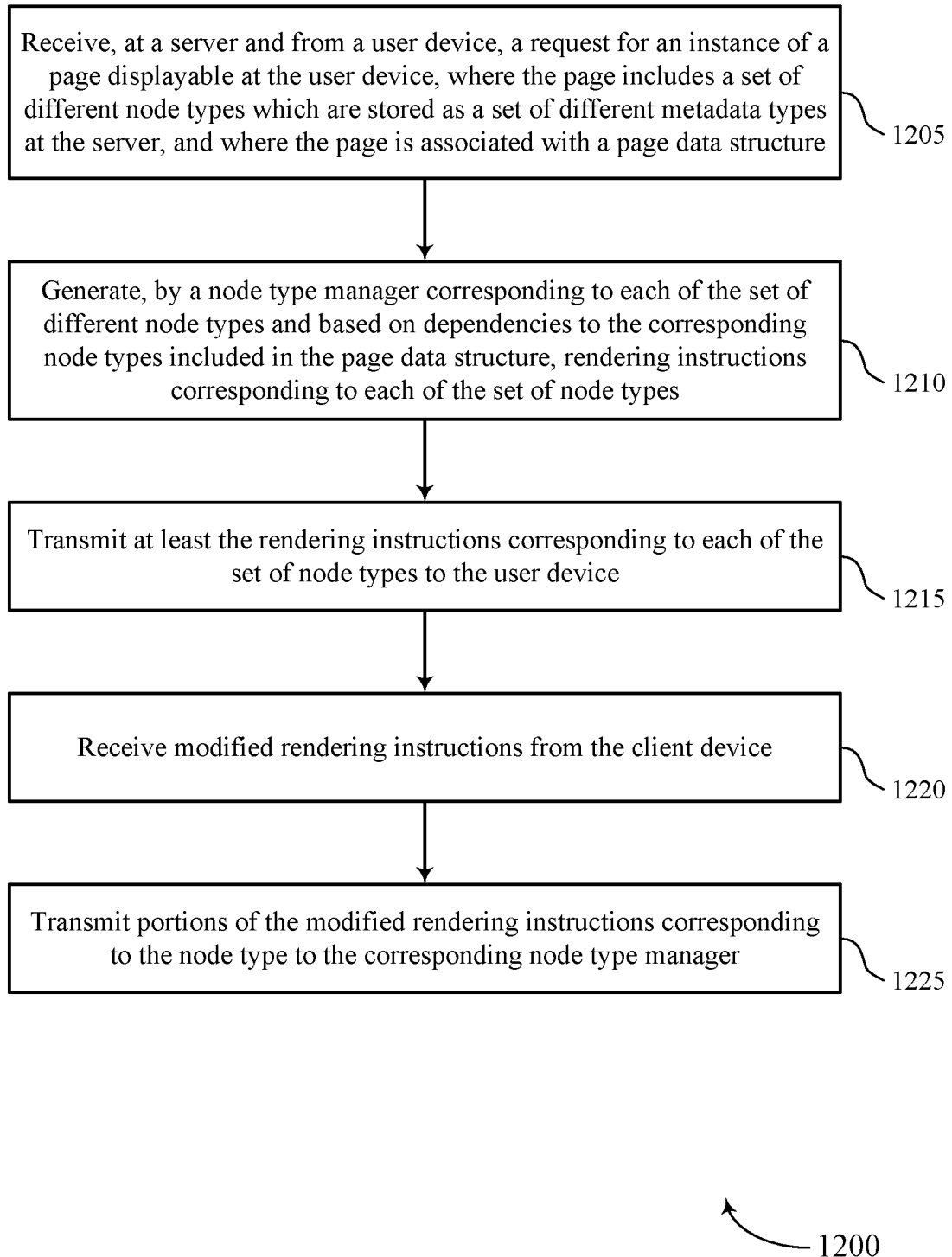

FIG. 12 shows a flowchart illustrating a method 1200 that supports an application builder with connected components in accordance with aspects of the present disclosure. The operations of method 1200 may be implemented by an application server or its components as described herein. For example, the operations of method 1200 may be performed by an application builder module as described with reference to FIGS. 7 through 9. In some examples, an application server may execute a set of instructions to control the functional elements of the application server to perform the functions described herein. Additionally or alternatively, an application server may perform aspects of the functions described herein using special-purpose hardware.

At 1205, the application server may receive, at a server and from a user device, a request for an instance of a page displayable at the user device, where the page includes a set of different node types which are stored as a set of different metadata types at the server, and where the page is associated with a page data structure. The operations of 1205 may be performed according to the methods described herein. In some examples, aspects of the operations of 1205 may be performed by a request interface as described with reference to FIGS. 7 through 9.

At 1210, the application server may generate, by a node type manager corresponding to each of the set of different node types and based on dependencies to the corresponding node types included in the page data structure, rendering instructions corresponding to each of the set of node types. The operations of 1210 may be performed according to the methods described herein. In some examples, aspects of the operations of 1210 may be performed by a node type manager as described with reference to FIGS. 7 through 9.

At 1215, the application server may transmit at least the rendering instructions corresponding to each of the set of node types to the user device. The operations of 1215 may be performed according to the methods described herein. In some examples, aspects of the operations of 1215 may be performed by an instruction interface as described with reference to FIGS. 7 through 9.

At 1220, the application server may receive modified rendering instructions from the client device. The operations of 1220 may be performed according to the methods described herein. In some examples, aspects of the operations of 1220 may be performed by a client interface as described with reference to FIGS. 7 through 9.

At 1225, the application server may transmit portions of the modified rendering instructions corresponding to the node type to the corresponding node type manager. The operations of 1225 may be performed according to the methods described herein. In some examples, aspects of the operations of 1225 may be performed by an instruction storing component as described with reference to FIGS. 7 through 9.

A method of editing components of a user interface is described. The method may include receiving, at a server and from a user device, a request for an instance of a page displayable at the user device, where the page includes a set of different node types which are stored as a set of different metadata types at the server, and where the page is associated with a page data structure, generating, by a node type manager corresponding to each of the set of different node types and based on dependencies to the corresponding node types included in the page data structure, rendering instructions corresponding to each of the set of node types, and transmitting at least the rendering instructions corresponding to each of the set of node types to the user device.

An apparatus for editing components of a user interface is described. The apparatus may include a processor, memory in electronic communication with the processor, and instructions stored in the memory. The instructions may be executable by the processor to cause the apparatus to receive, at a server and from a user device, a request for an instance of a page displayable at the user device, where the page includes a set of different node types which are stored as a set of different metadata types at the server, and where the page is associated with a page data structure, generate, by a node type manager corresponding to each of the set of different node types and based on dependencies to the corresponding node types included in the page data structure, rendering instructions corresponding to each of the set of node types, and transmit at least the rendering instructions corresponding to each of the set of node types to the user device.

Another apparatus for editing components of a user interface is described. The apparatus may include means for receiving, at a server and from a user device, a request for an instance of a page displayable at the user device, where the page includes a set of different node types which are stored as a set of different metadata types at the server, and where the page is associated with a page data structure, generating, by a node type manager corresponding to each of the set of different node types and based on dependencies to the corresponding node types included in the page data structure, rendering instructions corresponding to each of the set of node types, and transmitting at least the rendering instructions corresponding to each of the set of node types to the user device.

A non-transitory computer-readable medium storing code for editing components of a user interface is described. The code may include instructions executable by a processor to receive, at a server and from a user device, a request for an instance of a page displayable at the user device, where the page includes a set of different node types which are stored as a set of different metadata types at the server, and where the page is associated with a page data structure, generate, by a node type manager corresponding to each of the set of different node types and based on dependencies to the corresponding node types included in the page data structure, rendering instructions corresponding to each of the set of node types, and transmit at least the rendering instructions corresponding to each of the set of node types to the user device.

Some examples of the method, apparatuses, and non-transitory computer-readable medium described herein may further include operations, features, means, or instructions for identifying the node type manager corresponding to each of the set of node types based on the dependencies to each of the plurality of different node types included in the page data structure.

Some examples of the method, apparatuses, and non-transitory computer-readable medium described herein may further include operations, features, means, or instructions for transmitting, to the node type manager corresponding to each of the set of different node types, a request for the rendering instructions responsive to identifying the corresponding to node type manager based on the dependencies including in the page data structure.

Some examples of the method, apparatuses, and non-transitory computer-readable medium described herein may further include operations, features, means, or instructions for combining each of the rendering instructions, generated by the corresponding node type manager, into a combined list of instructions.

Some examples of the method, apparatuses, and non-transitory computer-readable medium described herein may further include operations, features, means, or instructions for generating, by one of the node type managers, at least one of the dependencies to the corresponding node types.

Some examples of the method, apparatuses, and non-transitory computer-readable medium described herein may further include operations, features, means, or instructions for receiving modified rendering instructions from the client device and transmitting portions of the modified rendering instructions corresponding to the node type to the corresponding node type manager.

Some examples of the method, apparatuses, and non-transitory computer-readable medium described herein may further include operations, features, means, or instructions for generating a tree structure including the rendering instructions corresponding to each set of node types.

Some examples of the method, apparatuses, and non-transitory computer-readable medium described herein may further include operations, features, means, or instructions for generating, by the node type manager, the node of the tree structure corresponding to each of the set of different node types.

In some examples of the method, apparatuses, and non-transitory computer-readable medium described herein, transmitting at least the rendering instructions to the user device further may include operations, features, means, or instructions for transmitting the tree structure to the user device.

In some examples of the method, apparatuses, and non-transitory computer-readable medium described herein, each of the set of node types may be associated with a node of the tree structure.

In some examples of the method, apparatuses, and non-transitory computer-readable medium described herein, the tree structure includes a node corresponding to each of the set of node types and where at least one node of the tree structure corresponds to a container node type node including a parameter indicating a child node corresponding to an element node type.

In some examples of the method, apparatuses, and non-transitory computer-readable medium described herein, the rendering instructions include parameters indicating a node type, a display region, a parent node, a child node, or a combination thereof.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for editing components of a user interface, comprising:
    receiving, at a server and from a user device, a request for an instance of a page displayable at the user device, wherein the page includes a plurality of different node types which are stored as a plurality of different metadata types at the server, and wherein the page is associated with a page data structure including dependencies identifying each of the plurality of different node types;
    transmitting, to a node type manager corresponding to a node type of the plurality of node types identified by a dependency included in the page data structure and using an application programming interface (API) corresponding to the node type, a request for rendering instructions for the node type;
    receiving, from the node type manager and via the API in response to the request, the rendering instructions corresponding to the node type, wherein the received rendering instructions include an additional dependency to an additional node type, wherein a request for the rendering instructions corresponding to the additional node type is automatically transmitted based at least in part on receiving the additional dependency for the additional node type in the rendering instructions;
    combining each of the rendering instructions, generated by the corresponding node type manager, into a combined list of instructions; and
    transmitting at least the combined list of rendering instructions corresponding to each of the plurality of different node types to the user device.

2. The method of claim 1, further comprising:
    identifying the node type manager corresponding to each of the plurality of different node types based on the dependencies to each of the plurality of different node types included in the page data structure.

3. The method of claim 1, further comprising:
    generating, by one of the node type managers, at least one of the dependencies to the corresponding node types.

4. The method of claim 1, further comprising:
    receiving modified rendering instructions from the user device; and
    transmitting portions of the modified rendering instructions corresponding to the node type to the corresponding node type manager.

5. The method of claim 1, further comprising:
    generating a tree structure including the rendering instructions corresponding to each node type of the plurality of different node types.

6. The method of claim 5, wherein the tree structure includes a node corresponding to each of the plurality of different node types, the method further comprising:
    generating, by the node type manager, the node of the tree structure corresponding to each of the plurality of different node types.

7. The method of claim 5, wherein transmitting at least the rendering instructions to the user device further comprises:
    transmitting the tree structure to the user device.

8. The method of claim 5, wherein each of the plurality of different node types is associated with a node of the tree structure.

9. The method of claim 5, wherein the tree structure includes a node corresponding to each of the plurality of different node types and wherein at least one node of the tree structure corresponds to a container node type node including a parameter indicating a child node corresponding to an element node type.

10. The method of claim 1, wherein the rendering instructions include parameters indicating a node type, a display region, a parent node, a child node, or a combination thereof.

11. An apparatus for editing components of a user interface, comprising:
    a processor,
    memory in electronic communication with the processor; and
    instructions stored in the memory and executable by the processor to cause the apparatus to:
        receive, at a server and from a user device, a request for an instance of a page displayable at the user device, wherein the page includes a plurality of different node types which are stored as a plurality of different metadata types at the server, and wherein the page is associated with a page data structure including dependencies identifying each of the plurality of different node types;
        transmit, to a node type manager corresponding to a node type of the plurality of node types identified by a dependency included in the page data structure and using an application programming interface (API) corresponding to the node type, a request for rendering instructions for the node type;
        receive, from the node type manager and via the API in response to the request, the rendering instructions corresponding to the node type, wherein the received rendering instructions include an additional dependency to an additional node type, wherein a request for the rendering instructions corresponding to the additional node type is automatically transmitted based at least in part on receiving the additional dependency for the additional node type in the rendering instructions;
        combine each of the rendering instructions, generated by the corresponding node type manager, into a combined list of instructions; and
        transmit at least the combined list of rendering instructions corresponding to each of the plurality of different node types to the user device.

12. The apparatus of claim 11, wherein the instructions are further executable by the processor to cause the apparatus to:
    identify the node type manager corresponding to each of the plurality of different node types based on the dependencies to each of the plurality of different node types included in the page data structure.

13. The apparatus of claim 11, wherein the instructions are further executable by the processor to cause the apparatus to:
    receive modified rendering instructions from the user device; and
    transmit portions of the modified rendering instructions corresponding to the node type to the corresponding node type manager.

14. The apparatus of claim 11, wherein the instructions are further executable by the processor to cause the apparatus to:
    generate a tree structure including the rendering instructions corresponding to each node type of the plurality of different node types, wherein each of the plurality of different node types is associated with a node of the tree structure.

15. A non-transitory computer-readable medium storing code for editing components of a user interface, the code comprising instructions executable by a processor to:

receive, at a server and from a user device, a request for an instance of a page displayable at the user device, wherein the page includes a plurality of different node types which are stored as a plurality of different metadata types at the server, and wherein the page is associated with a page data structure including dependencies identifying each of the plurality of different node types;

transmit, to a node type manager corresponding to a node type of the plurality of node types identified by a dependency included in the page data structure and using an application programming interface (API) corresponding to the node type, a request for rendering instructions for the node type;

receive, from the node type manager and via the API in response to the request, the rendering instructions corresponding to the node type, wherein the received rendering instructions include an additional dependency to an additional node type, wherein a request for the rendering instructions corresponding to the additional node type is automatically transmitted based at least in part on receiving the additional dependency for the additional node type in the rendering instructions;

combine each of the rendering instructions, generated by the corresponding node type manager, into a combined list of instructions; and transmit at least the combined list of rendering instructions corresponding to each of the plurality of different node types to the user device.

16. The non-transitory computer-readable medium of claim 15, wherein the instructions are further executable to:
identify the node type manager corresponding to each of the plurality of different node types based on the dependencies to each of the plurality of different node types included in the page data structure.

17. The non-transitory computer-readable medium of claim 15, wherein the instructions are further executable to:
receive modified rendering instructions from the user device; and
transmit portions of the modified rendering instructions corresponding to the node type to the corresponding node type manager.

18. The non-transitory computer-readable medium of claim 15, wherein the instructions are further executable to:
generate a tree structure including the rendering instructions corresponding to each node type of the plurality of different node types, wherein each of the plurality of different node types is associated with a node of the tree structure.

* * * * *